(12) United States Patent
Park et al.

(10) Patent No.: US 9,229,741 B2
(45) Date of Patent: Jan. 5, 2016

(54) MOBILE TERMINAL AND APPLICATION PROVIDING METHOD FOR THE SAME

(71) Applicant: Samsung Electronics Co., Ltd., Gyeonggi-do (KR)

(72) Inventors: Hyunsang Park, Seoul (KR); Juha Park, Gyeonggi-do (KR); Ilwoong Jeong, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 96 days.

(21) Appl. No.: 13/679,008

(22) Filed: Nov. 16, 2012

(65) Prior Publication Data

US 2013/0326500 A1     Dec. 5, 2013

(30) Foreign Application Priority Data

Jun. 4, 2012   (KR) .......................... 10-2012-0059606

(51) Int. Cl.
| G06F 9/445 | (2006.01) |
| G06F 21/00 | (2013.01) |
| G06F 9/00 | (2006.01) |
| H04L 29/06 | (2006.01) |
| H04L 29/08 | (2006.01) |
| H04W 4/00 | (2009.01) |

(52) U.S. Cl.
CPC ....... *G06F 9/445* (2013.01); *G06F 9/00* (2013.01); *G06F 21/00* (2013.01); *H04L 63/00* (2013.01); *H04L 67/34* (2013.01); *H04W 4/001* (2013.01)

(58) Field of Classification Search
CPC ..................................... G06F 8/60; G06F 8/61
USPC .......................................................... 717/177
See application file for complete search history.

(56) References Cited

U.S. PATENT DOCUMENTS

| 7,552,474 | B2 * | 6/2009 | Gurda et al. .................. 717/175 |
| 7,627,763 | B2 * | 12/2009 | Fujimoto et al. .............. 713/177 |
| 8,346,223 | B1 * | 1/2013 | Byrnes et al. ................. 717/177 |
| 8,464,249 | B1 * | 6/2013 | Goldman et al. .............. 717/176 |
| 8,527,982 | B1 * | 9/2013 | Sapuntzakis et al. ......... 717/174 |
| 8,676,273 | B1 * | 3/2014 | Fujisaki ........................ 455/567 |
| 8,874,935 | B2 * | 10/2014 | Basmov et al. ............... 713/193 |
| 2007/0033586 | A1 * | 2/2007 | Hirsave et al. ................ 717/174 |
| 2007/0074031 | A1 * | 3/2007 | Adams et al. ................. 713/176 |
| 2009/0064108 | A1 | 3/2009 | De Atley et al. |

(Continued)

OTHER PUBLICATIONS

Lei et al., "Generating Digital Signatures on Mobile Devices", 2004, IEEE.*

(Continued)

*Primary Examiner* — Anna Deng
*Assistant Examiner* — Junchun Wu
(74) *Attorney, Agent, or Firm* — Cha & Reiter, LLC.

(57) ABSTRACT

A mobile terminal and application providing method for same are disclosed whereby the method provides a requested application using an application package installer having multiple pieces of signature information. The application providing method comprises: obtaining an application package installer containing multiple pieces of signature information; determining whether signature information corresponding to the mobile terminal is present in the multiple pieces of signature information; and generating, when signature information corresponding to the mobile terminal is present, a signed application package based on the corresponding signature information.

18 Claims, 7 Drawing Sheets

(56) References Cited

U.S. PATENT DOCUMENTS

| | | | |
|---|---|---|---|
| 2009/0164793 A1* | 6/2009 | Yoshioka et al. | 713/180 |
| 2009/0186608 A1* | 7/2009 | Lee et al. | 455/416 |
| 2011/0296394 A1* | 12/2011 | Vidal et al. | 717/171 |
| 2012/0166437 A1* | 6/2012 | Esteve Balducci et al. | 707/736 |
| 2012/0173606 A1* | 7/2012 | Becker | 709/203 |
| 2012/0278606 A1* | 11/2012 | Huang | 713/2 |
| 2013/0036272 A1* | 2/2013 | Nelson | 711/147 |

OTHER PUBLICATIONS

Kostiainen et al. "Old, New, Borrowed, Blue—A Perspective on the Evolution of Mobile Platform Security Architectures", Feb. 2011, ACM.*

* cited by examiner

MOBILE TERMINAL AND APPLICATION PROVIDING METHOD FOR THE SAME

CLAIM OF PRIORITY

This application claims the benefit under 35 U.S.C. §119 (a) of a Korean patent application filed on Jun. 4, 2012 in the Korean Intellectual Property Office and assigned Serial No. 10-2012-0059606, the entire disclosure of which is hereby incorporated by reference.

BACKGROUND OF THE INVENTION

1. Field of the Invention

The present invention relates to an application providing method for a mobile terminal and, more particularly, to a mobile terminal and an application providing method that provide an application using an application package installer having multiple pieces of signature information.

2. Description of the Related Art

With active development of applications for mobile terminals, application servers provide users with various application packages in downloadable form.

To install an application onto a mobile terminal using an application package, the mobile terminal has to receive signature information signed with a signature key suitable for the mobile terminal together with the application package.

Currently, an application package is associated with a single piece of signature information.

To provide an application to a particular mobile terminal, multiple application packages are created corresponding in number to terminal types and each such application package is associated with signature information specific to a particular terminal type.

Creating multiple application packages for different terminal types is an unnecessary use of time and effort. In addition, whenever a new type of mobile terminal is manufactured, new application packages need to be created and maintained.

SUMMARY OF THE INVENTION

The present invention provides a mobile terminal and application providing method for same that use an application package installer having multiple pieces of signature information.

The present invention also provides a mobile terminal and application providing method for same that install an application using signature information specific to the mobile terminal from an application package installer having multiple pieces of signature information.

In accordance with an exemplary embodiment of the present invention, there is provided an application providing method for a mobile terminal, the method comprising: obtaining an application package installer containing multiple pieces of signature information; determining whether signature information corresponding to the mobile terminal is present in the multiple pieces of signature information; and generating, when signature information corresponding to the mobile terminal is present, a signed application package based on the corresponding signature information.

The multiple pieces of signature information may correspond to multiple mobile terminals employing different signatures, and the multiple mobile terminals may obtain corresponding signature information from the same application package installer.

Determining whether corresponding signature information is present may include repeatedly checking whether one of the multiple pieces of signature information corresponds to the mobile terminal.

Determining whether corresponding signature information is present may include: obtaining information on mappings between multiple terminals and multiple pieces of signature information from the application package installer; and checking whether signature information corresponding to when the mobile terminal is present in the multiple pieces of signature information based on the mapping information.

The application providing method may further include outputting, when signature information corresponding to the mobile terminal is not present, a message indicating absence of corresponding signature information.

The application providing method may further comprise: checking the validity of the signature information corresponding to the mobile terminal; and installing, when the corresponding signature information is valid, a requested application using the signed application package.

The application providing method may further include outputting, when the corresponding signature information is not valid, a message indicating application installation failure.

In accordance with another exemplary embodiment of the present invention, there is provided a mobile terminal capable of providing applications, comprising: a communication unit sending and receiving data to and from an external entity; a control unit controlling the communication unit to obtain an application package installer containing multiple pieces of signature information, determining whether signature information corresponding to the mobile terminal is present in the multiple pieces of signature information, and generating, when corresponding signature information is present, a signed application package based on the corresponding signature information.

The multiple pieces of signature information may correspond to multiple mobile terminals employing different signatures, and the application package installer may be used to enable multiple mobile terminals to obtain corresponding signature information.

The control unit may repeatedly check whether one of the multiple pieces of signature information corresponds to a particular mobile terminal.

The control unit may obtain information on mappings between multiple terminals and multiple pieces of signature information from the application package installer, and check whether signature information corresponding to the mobile terminal is present in the multiple pieces of signature information based on the mapping information.

The mobile terminal may further include a display unit for displaying information. When signature information corresponding to the mobile terminal is not present, the control unit may control the display unit to output a message indicating absence of corresponding signature information. Also, when the corresponding signature information is not valid, the control unit may control the display unit to output a message indicating application installation failure.

The control unit may check the validity of the signature information corresponding to the mobile terminal, and install, when the corresponding signature information is valid, a requested application using the signed application package.

In accordance with another exemplary embodiment of the present invention, there is provided a storage medium for storing an application package installer that contains an application package and multiple pieces of signature information so as to enable multiple mobile terminals employing different signatures to obtain corresponding signature information from the application package installer.

BRIEF DESCRIPTION OF THE DRAWINGS

The features and advantages of the present invention will be more apparent from the following detailed description in conjunction with the accompanying drawings, in which.

DETAILED DESCRIPTION OF EXEMPLARY EMBODIMENTS

Hereinafter, exemplary embodiments of the present invention are described in detail with reference to the accompanying drawings. Particular terms may be defined to describe the invention in the best manner without limiting the subject matter of the present invention. Accordingly, the meaning of specific terms or words used in the specification and the claims should not be limited to the literal or commonly employed sense, but should be construed in accordance with the spirit of the invention as described in the specification.

The present invention is applicable to a terminal or mobile terminal capable of executing applications.

The present invention may be applied to any information device capable of executing applications, such as a smartphone, portable terminal, mobile terminal, personal digital assistant (PDA), portable multimedia player (PMP), laptop computer, WiBro terminal or smart TV, and to various services using said devices.

In the description, an "application package" is an entity, object or data item that is created to provide an application to a mobile terminal. An application package may refer to data such as an application installation file and application information file. Application packages may be created by various providers, and may be provided to mobile terminals through servers, web browsers, or separate applications.

An "application package installer" is data related to a combination of an application package and signature information. In one embodiment, an application package installer may have multiple pieces of signature information.

Figure 1:
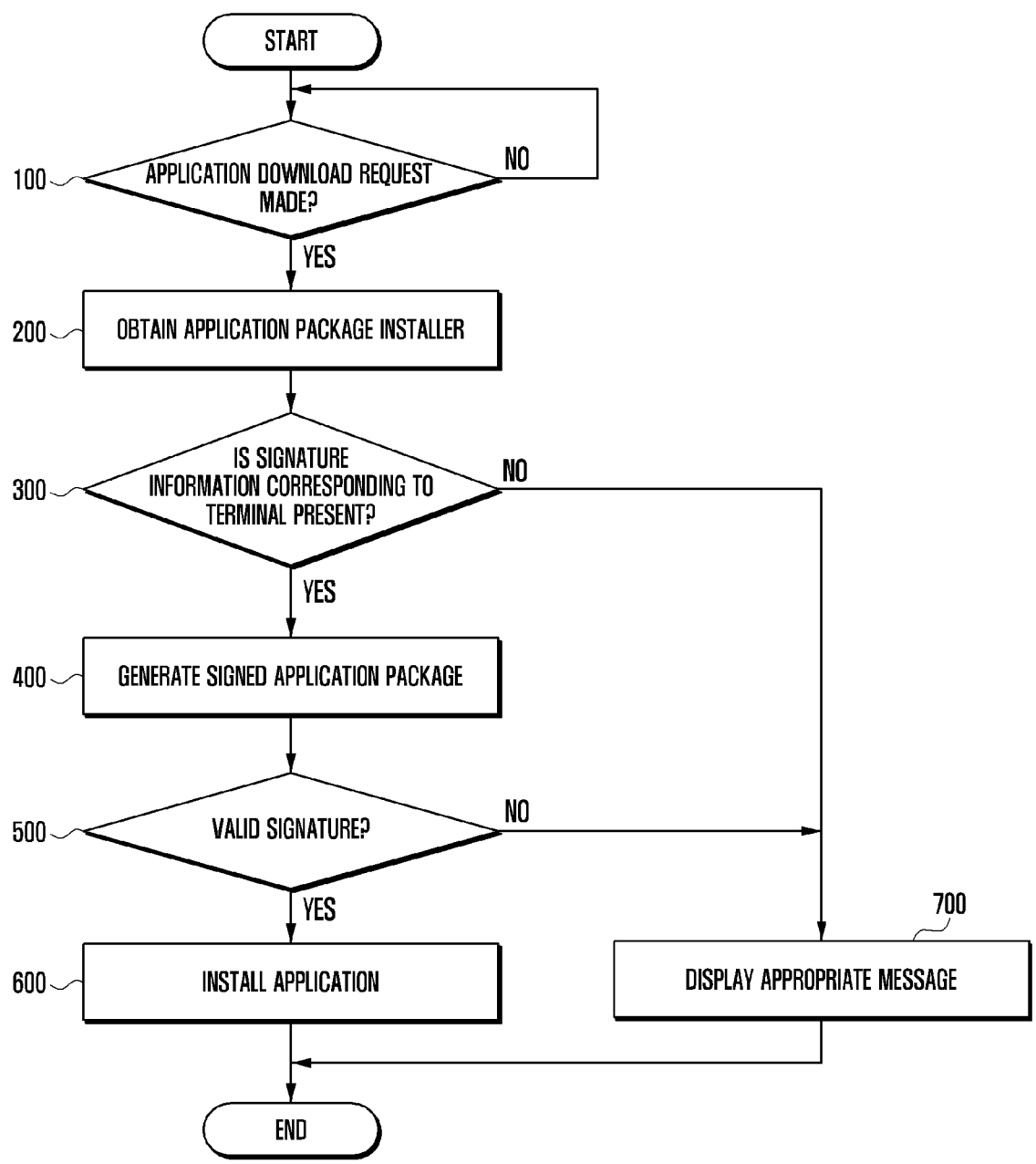
FIG. 1 is a flowchart of an application providing method according to an embodiment of the present invention.

FIG. 1 is a flowchart of an application providing method according to an embodiment of the present invention.

Referring to FIG. 1, in the application providing method, in step 100, the mobile terminal checks whether an application download request is made. The user may make an application download request through an input unit. The user may make a download request through a webpage linked with an application providing server or through a separate executable program supporting application provision. An application download request may also be issued by an automatic application update procedure.

When an application download request is made, the method of the present invention moves to step 200 where the mobile terminal obtains an application package installer. For example, in response to an application download request, the mobile terminal may obtain an application package installer from a server. A webpage linked with a server or a separate program supporting application provision may provide addresses of application servers storing an application package installer, to allow the mobile terminal to obtain the application package installer.

An application package, which may be part of an application package installer, may have multiple pieces of signature information, which correspond to individual mobile terminals using different signatures respectively; that is, multiple mobile terminals may obtain signature information from the same application package installer.

An application package installer itself may function as an application package. In such a case, the application package installer may be provided as a combination of an application package and signature information.

Figure 2:
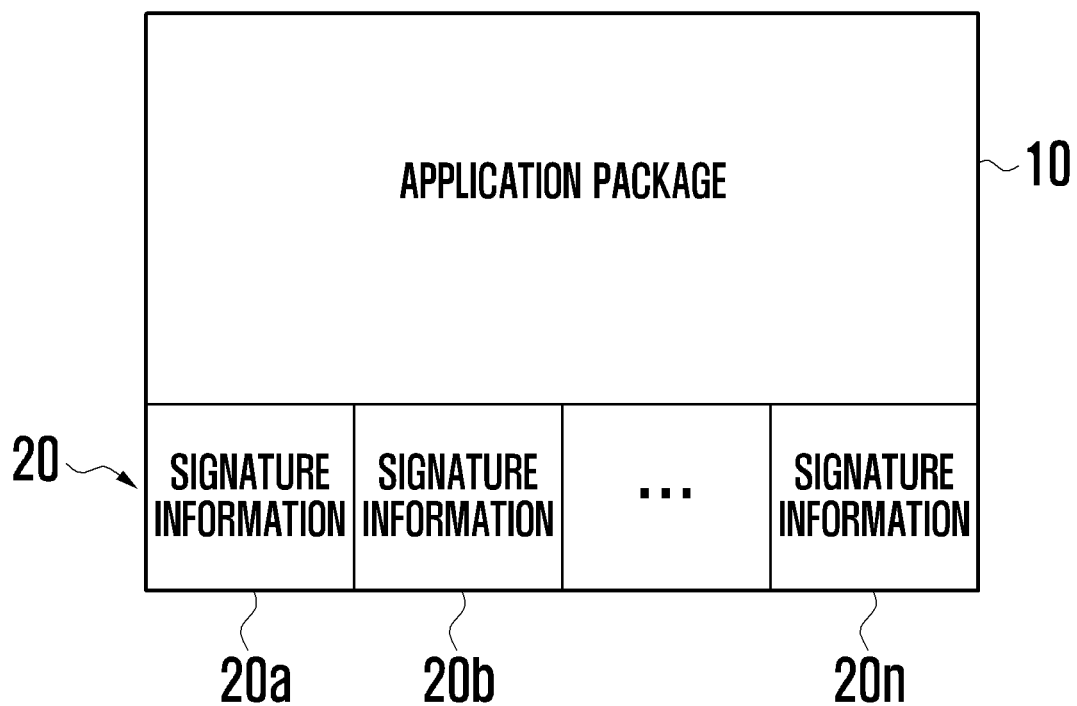
FIG. 2 illustrates a structure of an application package installer used in the present invention.
Figure 3:
FIG. 3 illustrates a format of signature information included in the application package installer.

Referring momentarily to FIGS. 2 and 3, one example of a data structure of an application package installer is disclosed. In particular, an application package installer may include an application package 10 and multiple pieces of signature information 20a to 20n.

The application package 10 may have a filename extension ".apk", and may include an application installation file and application information file.

The application installation file may be created by compiling and linking C, C++, Java or other source programs and libraries into an executable file and compressing the executable file. In a mobile terminal, the application installation file may be decompressed so that the application is executable.

The application information file contains various information on the application, and may be referred to as a manifest file and be written in XML. The application information file may also contain information items such as application name, version, icons, activities, services, provider, application components, usage rights, and external libraries.

The signature information 20a to 20n may be contained in the application package installer as a folder META.INF, and may be created by a signature algorithm such as SHA1 (Secure Hash Algorithm 1), RSA (Rivest-Shamir-Adleman) or DSA (Digital Signature Algorithm) using a public key generated by a key generation algorithm such as RSA or DSA.

In FIG. 3, the signature information 20a to 20n may include a signature file 21, a manifest file 22, and a signature block file 23.

The signature file 21 may have an extension ".SF", and may have such filenames as CERT.SF, RSA31.SF or alias.SF. The signature file 21 may be created using a value contained in the manifest file 22. More specifically, the signature file 21 may include hash values, which are obtained by hashing code sections for files in the manifest file 22 with SHA1, encoded in a Base64 scheme. The signature file 21 may include a hash value, which is obtained by hashing the whole manifest file 22 with SHA1, encoded in a Base64 scheme at the beginning.

The manifest file 22 may have a filename such as MANIFEST.MF. The manifest file 22 may be created using meta-information on files forming the application package. More specifically, the manifest file 22 may include hash values, which are obtained by hashing files forming the unsigned application package with SHA1, encoded in a Base64 scheme. Here, each hash value may be composed of a filename, hash function name, and hash result.

The signature block file 23 may have an extension ".RSA" or ".DSA", and may have filenames such as CERT.RSA, RSA31.RSA, alias.DSA or alias.RSA. The signature block file 23 may include a certificate for a signature key and a signature for the signature file 21. The signature block file 23 may be composed of data encrypted by a public key distributed so that the mobile terminal may verify the signature.

Referring back to FIG. 1 and continuing with the method of the present invention, in step 300, the mobile terminal checks whether signature information corresponding to the mobile terminal is present. The mobile terminal may employ a specific signature scheme specifying options for a signature algorithm, signature key generation algorithm and certificate according to terminal type, manufacturer, version and platform. The mobile terminal may determine whether signature information suitable for the employed signature scheme is present in multiple pieces of signature information contained in the application package installer.

The mobile terminal may also determine whether signature information corresponding to the mobile terminal is present by executing a matching algorithm based on information regarding a signature algorithm and signature key. Such determination may be performed based on repeated comparison with respect to the signature information contained in the application package installer. Such determination may also be performed based on a mapping information corresponding to multiple pieces of signature information. Two examples of more detailed description of step 300—determining whether signature information corresponding to the mobile terminal is present—will now be described with reference to FIGS. 5 and 6.

Figure 5:
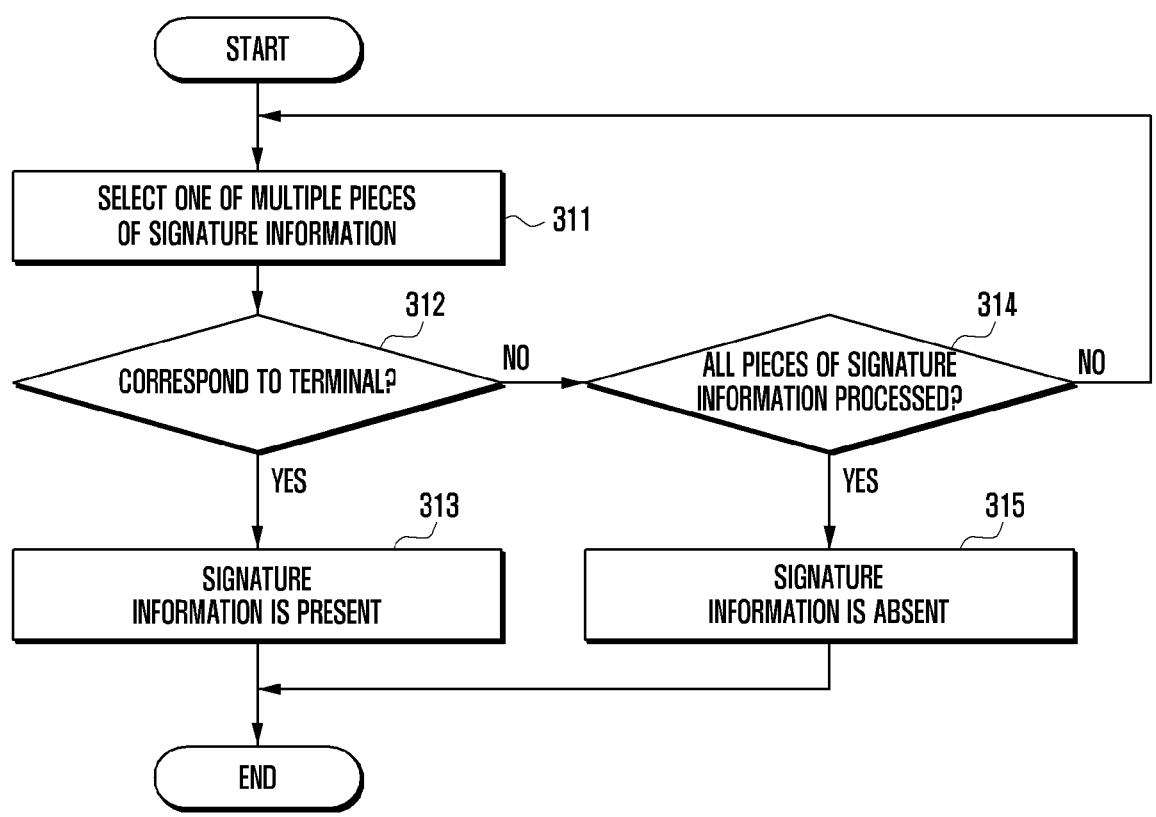
FIG. 5 is a flowchart of a first procedure for determining the presence of signature information.

FIG. 5 is a flowchart of a first procedure for determining presence of signature information. Referring to FIG. 5, to determine presence of signature information, the method of the present invention moves to step 311 where the mobile terminal selects one of multiple pieces of signature information contained in the application package installer. The mobile terminal may select specific signature information from the multiple pieces of signature information in sequence, at random, or in some order. Here, the mobile terminal avoids repeated selection of the same signature information.

In step 312, the mobile terminal checks whether the selected signature information corresponds to the mobile terminal. The mobile terminal may determine whether the selected signature information corresponds to the employed signature scheme specifying options for a signature algorithm, signature key generation algorithm and certificate according to terminal type, manufacturer, version and platform.

When the selected signature information corresponds to the mobile terminal, step 313 is performed where the mobile terminal concludes that corresponding signature information is present. The mobile terminal may temporarily save the corresponding signature information, and terminate the determination procedure.

When the selected signature information does not correspond to the mobile terminal, step 314 is performed where the mobile terminal checks whether all pieces of signature information contained in the application package installer have been processed for selection.

When all of the signature information has not been processed, the method of the present invention returns to step 311 where the mobile terminal selects signature information that has not yet been processed, and proceeds to step 312 to check whether the selected signature information corresponds to the mobile terminal.

If in step 314, all of the signature information has been processed, the method of the present invention returns to step 315 where the mobile terminal concludes that corresponding signature information is not present, and may terminate the determination procedure.

Figure 6:
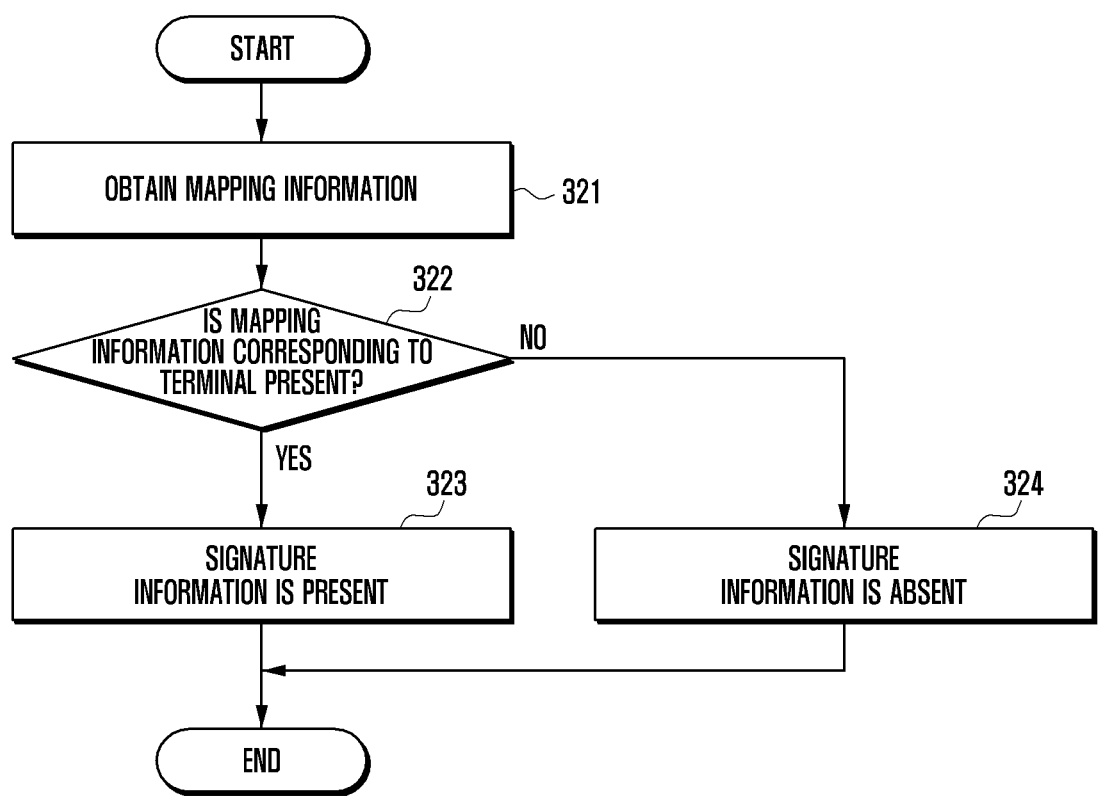
FIG. 6 is a flowchart of a second procedure for determining presence of signature information.

FIG. 6 is a flowchart of a second procedure for determining the presence of signature information. Referring to FIG. 6, in step 321, to determine presence of signature information, the mobile terminal obtains mapping information from the application package installer. The mapping information contains mappings between terminal information and multiple pieces of signature information, and may be in a form of a list or table. The mapping information may contain mappings between terminal information and locations of signature information in the application package installer or between terminal information and indexes of signature information.

In step 322, the mobile terminal checks whether mapping information corresponding to the mobile terminal is present. The mobile terminal may check whether mapping information of the signature information corresponding to the mobile terminal is present in the obtained mapping information by using a suitable matching algorithm.

If mapping information corresponding to the mobile terminal is present, the method of the present invention moves to step 323 where the mobile terminal concludes that corresponding signature information is present and may terminate the determination procedure. Here, the mobile terminal may find the corresponding signature information from the multiple pieces of signature information on the basis of the mapping information, and temporarily save the found signature information.

If, in step 322, it is determined that the mapping information corresponding to the mobile terminal is not present, the method of the present invention moves to step 324 where the mobile terminal concludes that corresponding signature information is not present and may terminate the determination procedure.

Referring back to and continuing with FIG. 1, if, in step 300, the mobile terminal determines that the signature information corresponding to the mobile terminal is not present, the method of the present invention moves to step 700 where the mobile terminal displays a message notifying of the absence of signature information corresponding to the mobile terminal. Here, the mobile terminal may display a message indicating that suitable signature information is not present in the application package installer or that the requested application is not installable. The notification message may be outputted in a text form or in a separate pop-up window. The notification message may be outputted alone or together with an image, icon, voice, sound or vibration.

If, however, signature information corresponding to the mobile terminal is present, the method of the present invention moves to step 400 where the mobile terminal generates a signed application package. The mobile terminal may generate a signed application package based on the corresponding signature information. The signed application package may be configured in a language or format suitable for installation in the mobile terminal.

Figure 4:
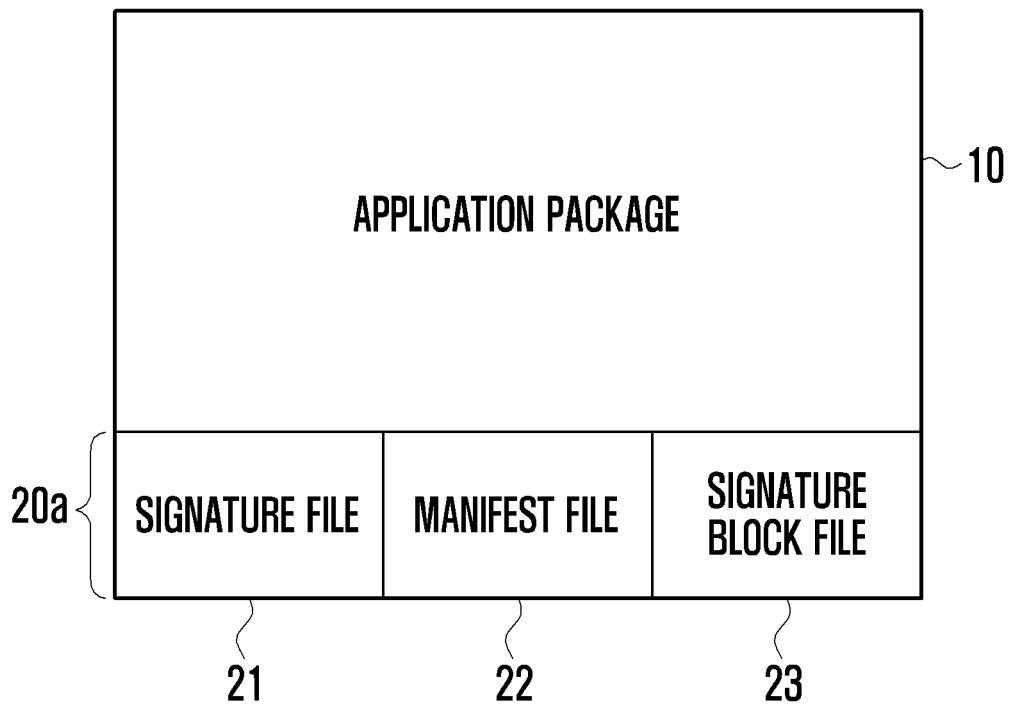
FIG. 4 illustrates a format of a signed application package used in the present invention.

Referring momentarily to FIG. 4, a signed application package may include an application package 10 and signature information 20*a*. The application package 10 may be the same as or may correspond to the application package 10 contained in the application package installer. The application package 10 may include an application installation file and an application information file as previously described.

The signature information 20*a* may be signature information determined to be suitable for the mobile terminal among the multiple pieces of signature information contained in the application package installer. As described before, the signature information 20a may include a signature file 21, a manifest file 22, and a signature block file 23.

Referring back to FIG. 1, in step 500 of the method of the present invention, the mobile terminal checks the validity of the signature. The mobile terminal may verify the signature by using the signature information.

The mobile terminal may analyze the signature information by using a distributed public key first, and then verify the signature on the basis of the analyzed signature information.

Signature verification may be performed to determine whether requirements for application package policy, provider, reliability, performance and security are satisfied. Signature verification may also be performed to verify developers, terminal compatibility, distribution market, or code integrity.

When the signature is determined to be valid, the method of the present invention moves to step 600 where the mobile terminal installs the application. In such a case, the mobile terminal installs the application in an executable state using the application installation file contained in the application package. During the installation process, the mobile terminal may output progress indications in a form of text, image, icon or as a popup window.

When the signature is determined not to be valid, the method of the present invention moves to step 700 where the mobile terminal displays a message indicating signature invalidity. Here, the mobile terminal may output a message indicating signature invalidity or application installation failure. This notification message may be outputted in text form or in a separate popup window. The notification message may be outputted alone or together with an image, icon, voice, sound or vibration.

Figure 7:
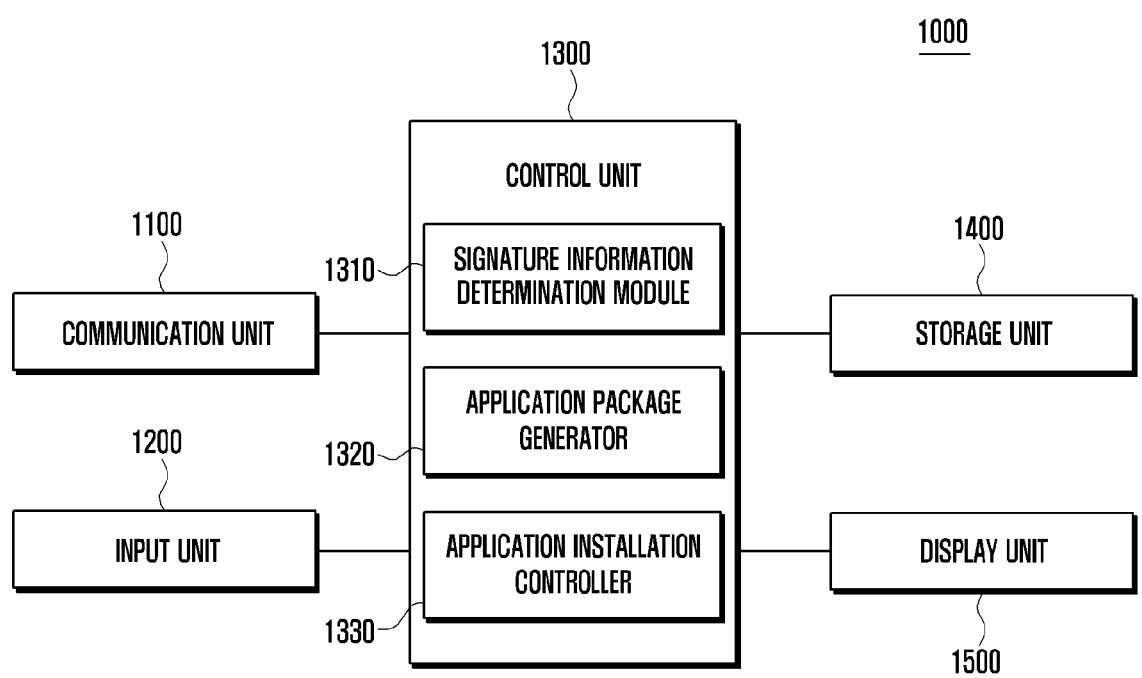
FIG. 7 is a block diagram of a mobile terminal supporting the application providing method according to another embodiment of the present invention.

FIG. 7 is an embodiment of the mobile terminal of the present invention wherein a block diagram of a mobile terminal 1000 with which the application providing method of the present invention can be performed.

Referring to FIG. 7, the mobile terminal 1000 may include a communication unit 1100, an input unit 1200, a control unit 1300, a storage unit 1400, and a display unit 1500.

The communication unit 1100 performs data transmission and reception operations for the mobile terminal 1000. The communication unit 1100 may include a transmitter for upconverting the frequency of a signal to be transmitted and amplifying the signal, and a receiver for low-noise amplifying a received signal and downconverting the frequency of the received signal. In particular, the communication unit 1100 may communicate with an application providing server, and obtain an application package installer from the application providing server.

The input unit 1200 may generate an input signal corresponding to user manipulation. The input unit 1200 may include a keypad, dome switch, touchpad (resistive or capacitive), jog wheel and jog switch. The input unit 1200 and the display unit 1500 may have a layered structure, and may be combined with a touch sensor or proximity sensor to form a touchscreen. In particular, the input unit 1200 may receive a request for application download or installation from the user.

The control unit 1300 controls the overall operation of the mobile terminal 1000. The control unit 1300 may control internal components of the mobile terminal 1000 to provide an application by means of an application package installer containing multiple pieces of signature information. The control unit 1300 may include a signature information determination module 1310, an application package generator 1320, and an application installation controller 1330.

Signature information determination module 1310 determines whether given signature information corresponds to the mobile terminal. The signature information determination module 1310 may determine whether signature information corresponding to the mobile terminal 1000 is present in multiple pieces of signature information by means of matching algorithms for signatures or signature keys.

The signature information determination module 1310 may determine whether signature information corresponding to the mobile terminal 1000 is present in multiple pieces of signature information on the basis of repeated comparison or mapping information contained in the application package installer.

The application package generator 1320 generates a signed application package. The application package generator 1320 may combine an application package and signature information corresponding to the mobile terminal 1000 to generate a signed application package.

The application installation controller 1330 installs an application in the mobile terminal 1000. The application installation controller 1330 may install an application using an application installation file contained in a given application package.

In one embodiment, the control unit 1300 may control the communication unit 1100 to obtain an application package installer containing multiple pieces of signature information, and check whether corresponding signature information is present in the multiple pieces of signature information. When corresponding signature information is present, the control unit 1300 may generate an application package on the basis of the corresponding signature information. The control unit 1300 may also check the validity of the corresponding signature information. When the corresponding signature information is valid, the control unit 1300 may install the application using a signed application package. When the corresponding signature information is not present or the corresponding signature information is not valid, the control unit 1300 may control the display unit 1500 to display a message notifying of absence or invalidity of signature information. More detailed operations of the control unit 1300 are described above in connection with FIGS. 1 to 6.

The storage unit 1400 may store programs, data and information necessary for operation of the mobile terminal 1000. In particular, the storage unit 1400 may temporarily store an application package installer, an application package file, an application signature information, terminal signature information. The storage unit 1400 may include one or more of various types of storage media, such as flash memory, hard disk, multimedia or other memory card, random access memory (RAM), static random access memory (SRAM), read only memory (ROM), programmable read-only memory (PROM), electrically erasable programmable read-only memory (EEPROM), magnetic memory, magnetic disk, and optical disc. The storage unit 1400 may function in cooperation with a web storage or cloud server on the Internet.

The display unit 1500 displays information processed by the mobile terminal 1000. The display unit 1500 may display a User Interface (UI) or Graphical User Interface (GUI) to install or execute an application in the mobile terminal 1000. The display unit 1500 may be realized using one or more of display techniques based on Liquid Crystal Display (LCD), Thin Film Transistor Liquid Crystal Display (TFT-LCD), organic light emitting diodes (OLED), flexible display, and 3D display. When the display unit 1500 is combined with a touch sensor or proximity sensor, it may act as a touchscreen. In this case, the display unit 1500 may be regarded as an input means as well as a display means. In particular, the display unit 1500 may display a message, image, icon, or window to receive a request for application download from the user.

When corresponding signature information is not present or the corresponding signature information is not valid, the display unit 1500 may display a message or the like indicating application installation failure under control of the control unit 1300.

In a feature of the present invention, the application providing method provides an application package installer supporting signature information for various terminal types. Hence, it is possible to avoid unnecessary consumption of time and effort required to create and manage application packages according to support or manufacture of a new type of mobile terminal.

The application providing method of the present invention may prevent occurrence of errors caused by use of different signature keys associated with application packages for different terminal types, and enable a user to conveniently receive an application through a single application package installer.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be understood that many variations and modifications of the basic inventive concept described herein will also fall within the spirit and scope of the present invention as defined in the appended claims.

What is claimed is:

1. An method for a mobile terminal, comprising:
obtaining an application package installer including an application package for installing a requested application and multiple pieces of signature information;
obtaining, from the application package installer, mapping information between multiple types of devices and the multiple pieces of signature information;
determining, based on the mapping information, whether at least one of the signature information corresponds to a type of the mobile terminal; and
generating, if the at least one of the signature information corresponds to the type of the mobile terminal, a signed application package using one of the at least one of the signature information;
wherein the multiple pieces of signature information comprises each piece of signature information including:
a signature file including a hash value,
a manifest file including hash values, which are obtained by hashing files forming an unsigned application package, and
a signature block file including a certificate for a signature key and a signature for the signature file.

2. The method of claim 1,
wherein the multiple pieces of signature information correspond to multiple types of devices employing different signature schemes, and
wherein the multiple types of devices obtain the signature information from the application package installer.

3. The method of claim 1,
wherein determining whether the at least one of the signature information corresponds to the type of the mobile terminal comprises detecting whether at least one of the multiple pieces of signature information corresponds to the type of the mobile terminal.

4. The method of claim 1, wherein determining whether at least one of the signature information corresponds to the type of the mobile terminal comprises:
detecting whether at least one of the signature information corresponds to the type of the mobile terminal based on the mapping information.

5. The method of claim 1, further comprising outputting, if all of the signature information do not correspond to the type of the mobile terminal, a message indicating absence of the at least one of the signature information corresponding to the type of the mobile terminal.

6. The method of claim 1, further comprising:
detecting validity of the at least one of the signature information; and
installing, if the at least one of the signature information is valid, the requested application using the signed application package.

7. The method of claim 6, further comprising outputting, if the signature information is not valid, a message indicating application installation failure.

8. A mobile terminal, comprising:
a communication unit configured to send and receive data; and
a control unit configured to
obtain an application package installer including an application package for installing a requested application, and multiple pieces of signature information,
obtain, from the application package installer, mapping information between multiple types of devices and the multiple pieces of signature information,
determine, based on the mapping information, whether at least one of the signature information corresponds to a type of the mobile terminal, and
generate, when the at least one of the signature information corresponds to the type of the mobile terminal, a signed application package using one of the at least one of the signature information;
wherein the multiple pieces of signature information comprises each piece of signature information including:
a signature file including a hash value,
a manifest file including hash values, which are obtained by hashing files forming an unsigned application package, and
a signature block file including a certificate for a signature key and a signature for the signature file.

9. The mobile terminal of claim 8, wherein the multiple pieces of signature information correspond to multiple types of devices employing different signature schemes, and wherein the application package installer is used to enable multiple types of devices to obtain the signature information.

10. The mobile terminal of claim 8, wherein the control unit repeatedly checks whether the at least one of the multiple pieces of signature information corresponds to the type of the mobile terminal.

11. The mobile terminal of claim 8, wherein the control unit is further configured to check whether at least one of the signature information corresponds to the type of the mobile terminal based on the mapping information.

12. The mobile terminal of claim 8, further comprising a display unit configured to display information, and the control unit controls, if all of the signature information do not correspond to the type of the mobile terminal, the display unit to output a message indicating absence of the signature information corresponding to the type of the mobile terminal.

13. The mobile terminal of claim 8, wherein the control unit checks validity of the at least one of the signature information, and installs, if the at least one of the signature information is valid, a requested application using the signed application package.

14. The mobile terminal of claim 13, further comprising a display unit configured to display information, and wherein, if the at least one of the signature information is not valid, the control unit controls the display unit to output a message indicating application installation failure.

15. A non-transitory computer-readable medium with instructions therein which upon execution cause at least one processor to:
   obtain an application package installer including an application package for installing a requested application, and multiple pieces of signature information;
   obtain, from the application package installer, mapping information between multiple types of devices and the multiple pieces of signature information;
   determine, based on the mapping information, whether at least one of the signature information corresponds to a type of a mobile terminal; and
   generate, when the at least one of the signature information corresponds to the type of the mobile terminal, a signed application package using one of the at least one of the signature information;
   wherein the multiple pieces of signature information comprises each piece of signature information including:
   a signature file including a hash value,
   a manifest file including hash values, which are obtained by hashing files forming an unsigned application package, and
   a signature block file including a certificate for a signature key and a signature for the signature file.

16. The method of claim 1, wherein the signature files further comprise hash values generated by hashing at least one of code sections of files in the manifest file and an entirety of the manifest file.

17. The method of claim 1, wherein the hash value further comprises a filename, a hash function name, and a hash result.

18. The method of claim 1, wherein the application package installer further comprises a signature block file comprising data encrypted by a public key that may be utilized to verify the signature file.

* * * * *